United States Patent [19]
Eastmond

[11] 4,088,832
[45] May 9, 1978

[54] SPLIT PHASE CODE SYNCHRONIZER AND DEMODULATOR

[75] Inventor: Bruce Charles Eastmond, Downers Grove, Ill.

[73] Assignee: Motorola, Inc., Schaumburg, Ill.

[21] Appl. No.: 731,078

[22] Filed: Oct. 12, 1976

[51] Int. Cl.² .............................................. H04L 7/00
[52] U.S. Cl. ...................................... 178/69.1; 178/88
[58] Field of Search .................. 178/69.1, 67, 68, 88; 325/320, 30

[56] References Cited

U.S. PATENT DOCUMENTS

| | | | |
|---|---|---|---|
| 3,743,775 | 7/1973 | Hutchinson | 178/69.1 |
| 3,820,083 | 6/1974 | Way | 178/69.1 |
| 3,932,705 | 1/1976 | Wolleman | 178/69.1 |
| 3,967,061 | 6/1976 | Dobias | 178/69.1 |
| 3,967,062 | 6/1976 | Dobias | 178/69.1 |

*Primary Examiner*—Benedict V. Safourek
*Assistant Examiner*—Michael A. Masinick
*Attorney, Agent, or Firm*—James P. Hamley; James W. Gillman

[57] ABSTRACT

An improved synchronizer for recovering the clock signal in split phase encoded data. The synchronizer includes a phase locked loop (PLL) which locks in phase with the encoded data at twice the data clock frequency. The output from the PLL is divided by two in a flip flop which is triggerable to produce an output at either 0° or 180° relative phase. The encoded data is detected in synchronism with the output of the flip flop and the resultant is integrated over each cycle of the flip flop signal. Comparator circuitry produces an error signal if the integrated value is within predetermined limits. A counter receives the error signals and, in response to a significant number thereof, activates the flip flop to produce its alternate phase output. In this manner, the flip flop output recovers the clock signal in proper phase.

The synchronizer may be used in combination with additionally disclosed circuitry for use as a full demodulator.

15 Claims, 2 Drawing Figures

| | | |
|---|---|---|
| RAW DATA | A | |
| CODED DATA | B | |
| CLOCK SYNC PULSES | C | |
| PLL 90° CLOCK | D | |
| PLL CLOCK ÷ 2 | E | |
| INVERTED DATA | F | |
| INTEGRATE AND DUMP | G | |
| SAMPLE PULSES | H | |
| RECOVERED DATA | I | |
| PHASE CHANGE CLOCK PULSES | J | |
| PLL CLOCK ÷ 2 | K | |
| INVERTED DATA | L | |
| INTEGRATE & DUMP | M | |
| SAMPLE PULSES | N | |
| RECOVERED DATA | O | |
| PHASE CHANGE CLOCK PULSES | P | |

SPLIT PHASE CODE SYNCHRONIZER AND DEMODULATOR

BACKGROUND OF THE INVENTION

The present invention pertains to the signal communication art and, in particular, to a means for synchronizing with, and demodulating split phase encoded data.

Split phase data encoding schemes are well known in the communication art. Raw digital data, i.e. a data bit stream containing a sequence of logic "ones" and "zeros", often contains low frequency signal components since the data is not constrained to be concentric about its central axis, i.e. the total number of ones does not have to equal the total number of zeros. Thus, transmission and reception apparatus, in order to handle raw data, requires the use of complicated and expensive circuitry having a bandwidth suitable for maintaining low frequency components. Moreover, raw digital data may contain long strings of "ones" or "zeros". A data clock regenerated from the bit stream may drift significantly during this period.

The split phase, or Manchester code was developed to avoid these problems. In such encoding systems, logic levels are represented by transitions in the encoded data. That is, a logic level "1" might be represented by a positive data transition, whereas the logic level "0" would be represented by a negative transition. In operation, the split phase encoded data bit stream is very symmetric about its axis whereby there are few, if any, low frequency components to be carried by the transmission system. The split phase code also insures that there is a signal transition in each bit time period regardless of the particular bit pattern being transmitted.

A problem with split phase encoding schemes is that proper decoding requires the resolution of a phase ambiguity. The encoding process operates by sensing the status of the informaion bit stream at a given clock frequency interval and generating the corresponding positive and negative encoded data stream transition. At the decoder, while it is a simple matter to recover the clock frequency, it is difficult to determine whether the recovered signal is synchronous to the transmitted clock frequency, or a 180° phase angle with respect thereto. Phase sense is critical since a necesssary condition for proper decoding is that the recovered clock signal be synchronized to the clock signal used in encoding. Thus, there has been a need for effective synchronizing circuitry to resolve the decoder phase ambiguity of split phase encoded data.

Of the several approaches for resolving the phase ambiguity in the decoder of split phase encoded data known in the art, all of them require elaborate and costly implementation, resulting in a prohibitive cost. Moreover, due to the large number of components required to implement the known synchronizer circuits, system reliability and accuracy has been a problem.

SUMMARY OF THE INVENTION

It is an object of this invention, therefore, to provide an improved synchronizer for use in resolving the phase ambiguity of split phase encoded data.

It is a particular object of the invention to provide the above described synchronizer which may be implemented in an inexpensive, reliable form.

Briefly, according to the invention, the synchronizer receives encoded data of the split phase, clock synchronous encoded type and recovers the clock signal, in proper phase, therefrom. The synchronizer comprises a reference signal generator which is selectable to produce either a first or a second reference signal. Each reference signal has the same frequency as the clock frequency with the two signals maintaining a relative phase angle of 180° with respect to each other. A synchronous detector is employed to synchronously detect the received encoded data and the particular selected reference signal. An integrator produces an integral signal which has a value representative of the integral of the output of the synchronous detector over each cycle of the selected reference signal. A comparator produces an output error signal in response to the integral signal having a value within predetermined minimum and maximum values. A control logic circuit processes the error signal and selects the alternate output from the reference signal means in response to the error signals being in a predetermined condition. Thus, the selected reference signal is synchronized to the encoding clock signal.

The synchronizer may be used as part of a full demodulator for split phase encoded data wherein the combination also includes a sample pulse generator which produces sample pulses at predetermined points in each cycle of the selected reference signal and a decoded data output circuit which produces the fully demodulated information data by generating an output signal having either a first or second logic level responsive to the status of the integral signal occurring synchronous to the generation of each sample pulse.

DETAILED DESCRIPTION OF THE PREFERRED EMBODIMENT OF THE INVENTION

Figure 1:
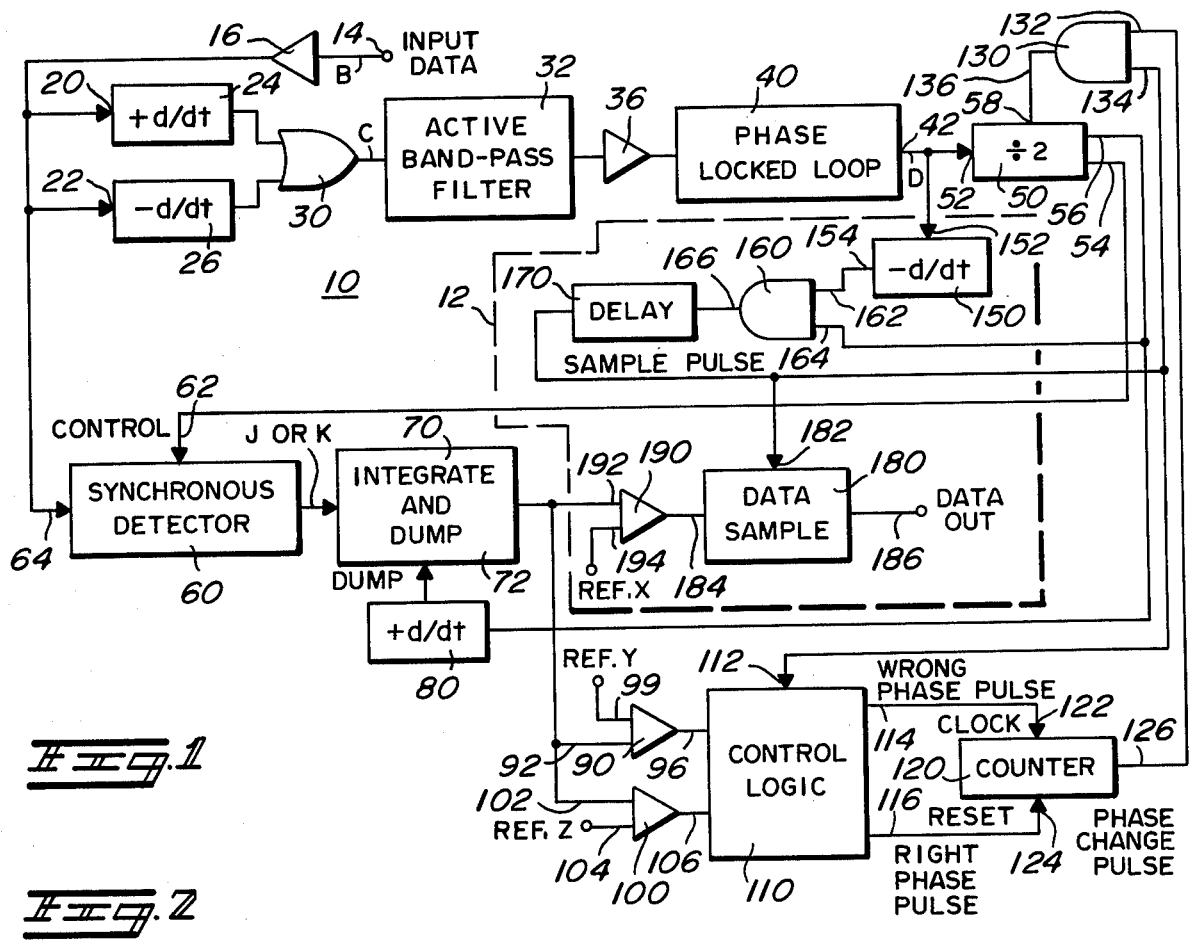
FIG. 1 is a schematic diagram illustrating the preferred construction of the synchronizer and demodulator according to the invention.
Figure 2:
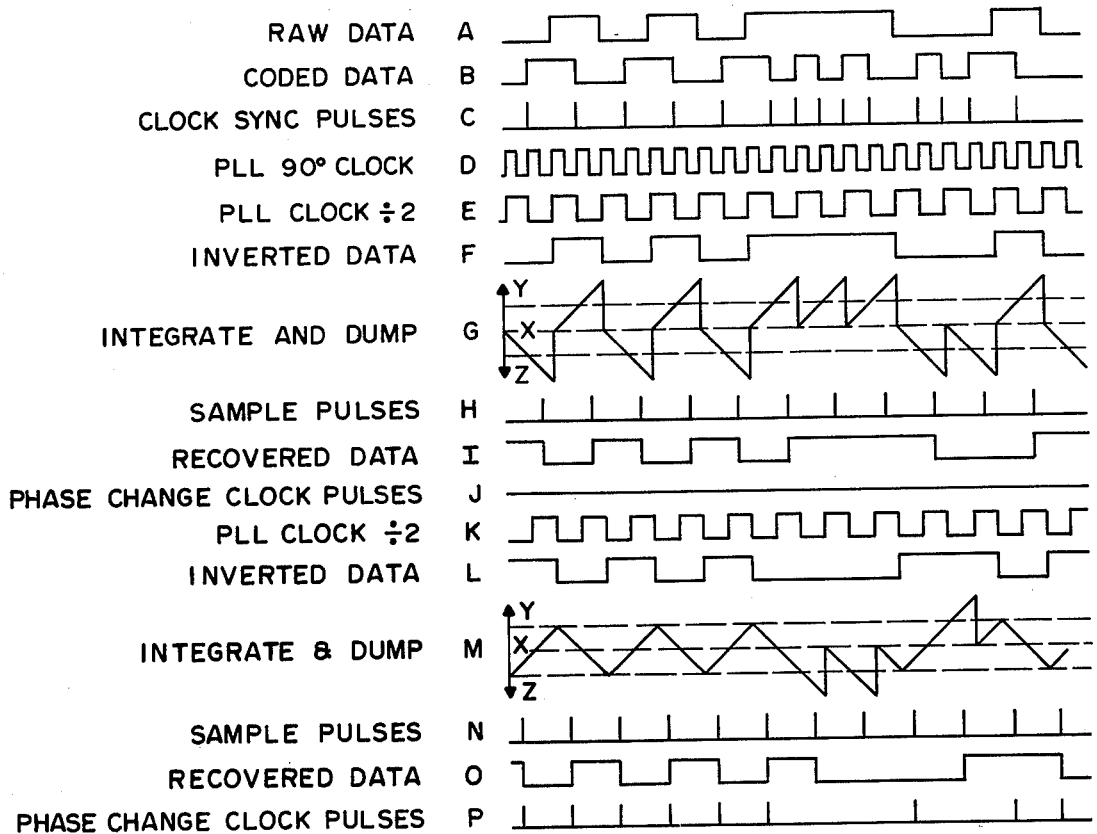
FIG. 2 is a sequence of signal waveforms illustrating operation of the circuit of FIG. 1.

FIG. 1 illustrates, in schematic diagrammatic form, a split phase encoded synchronizer, indicated generally at 10, in combination with demodulation circuitry 12. Operation of the circuit in FIG. 1 is more easily understood with reference to FIG. 2 which is a sequence of waveforms labeled A-P illustrating representative signal waveforms at indicated portions of the FIG. 1 circuit. The synchronizer 10 accepts at its input 14 the split phase, or Manchester encoded data, which, in the present example, is assumed to have originated at the transmission location (not shown). The split phase encoding process is understood with reference to FIGS. 2A and 2B. FIG. 2A illustrates representative raw data which is of the logic sequence 0-1-0-1-0-1-1-1-0-0-1. FIG. 2B is the translated split phase encoded form of FIG. 2A in which each raw data bit time period is split into two halves which, taken together, define a bit of split phase information. In FIG. 2B a raw data "one" is represented by a "one" in the first half of the corresponding bit time period and by a "zero" in the other half of the same bit time period. Conversely, a raw data "zero" is represented by a "one" and "zero" whose order is reversed from that used to represent a raw data "one". The encoding of the split phase waveform in FIG. 2B occurs at an established clock rate.

Referring again to FIG. 1, the encoded data at the synchronizer input 14 is processed by a limiting amplifier 16 and routed to the inputs 20, 22 of a pair of differentiaters 24, 26, respectively. The first differentiator 24 produces an output pulse corresponding to each positive transition of signals at its input 20. The second differentiator produces output pulses corresponding to the occurrence of a negative transition at its input 22. The transistion pulses from the differentiators 24, 26 are applied to two inputs of an OR gate 30 which, acting in the known manner, produces an output signal which is a sequence of pulses occurring at each transistion of the input coded data. Since the encoded data is synchronous to the fixed frequency clock, the input pulse are, therefore, clock sync pulses, as illustrated in FIG. 2C.

The clock sync pulses are fed to an active bandpass filter 32. The bandpass filter 32 is tuned to twice the known clock frequency of the encoder and, thus, passes those frequency components of the clock sync pulses at or near the second harmonic of the clock frequency.

The output from the bandpass filter 32 is processed by a limiting amplifier 36 and applied to a phase locked loop circuit, illustrated as a block 40. The phase locked loop is of conventional design having a narrow bandwidth at the second harmonic of the clock frequency to provide significant noise immunity. The output 42 of the phase locked loop 40 is a signal in phase quadrature lock, and at the same frequency as the signal at the phase locked loop input, i.e. the second harmonic of the encoding clock frequency. FIG. D illustrates the output from the phase locked loop 40.

The output 42 from the phase locked loop 40 is applied to the input 52 of a divide by two bistable or flip flop circuit 50. The flip flop 50 has a Q output 54 and a Q output 56. The outputs 54, 56 contain signals which are one-half of twice the clock frequency, and thus are at the clock frequency, whereas the relative phase relationship between the two outputs 54, 56 is 180°. The bistable 50 is also provided with a reset input 58 which, when activated, effectively switches the output phase of the two flip flop outputs 54, 56. Thus, the reset input 58 allows a means to change the phase of the output or reference signal from the bistable 50. FIGS. 2E and 2K illustrate examples of the two reference signals which are seen to be at the clock frequency and 180° out of phase with each other.

The Q output 54 of the divide by two flip flop 50 is connected to the control input 62 of a synchronous detector 60. The synchronous detector has a second input 64 to which is applied the output from the limiter 16. The synchronous detector 60, which may be implemented using a standard exclusive OR gate, produces an output 0 level in response to the signals at its input 62, 64 synchronously assuming the same logic state, whereas otherwise the synchronous detector 60 produces an output logic 1 level. Thus, depending upon whether the particular reference signal 2E or 2K has been selected, the synchronous detector 60 produces the output shown as either waveform 2F or 2L.

The output from the synchronous detector 60 is applied to an integrate and dump circuit 70. The integrate and dump circuit 70 is comprised of a standard analog type integrator which, upon receiving a dump signal at the dump input 72 is resettable to a reference level, such as 0 volts. In this particular application the dump input 72 is provided by coupling the Q output 56 of the bistable 50 through a positive differentiator 80. In so doing, the integrate and dump circuit 70 produces an integral signal whose magnitude assumes a value which is representative of the integral of the synchronous detector output over the interval of one cycle of the selected reference signal. Thus, depending upon whether the reference signal of waveform 2E or 2K is chosen the output from the integrate and dump circuit 70 will be either that shown in FIG. 2G or 2M.

The output from the integrate and dump circuit 70 is applied to the first inputs 92, 102 of a pair of comparators 90, 100, respectively. The comparators have second inputs 99, 104 and output terminals 96, 106. Applied to the second input 99 of comparator 90 is a predetermined fixed DC reference, reference Y. Applied to the second input 104 of the second comparator 100 is a second predetermined reference source, reference Z. References Y, Z define upper and lower predetermined limits for the integrated waveform, as is illustrated in FIGS. 2G and 2M. The first comparator 90 produces an output pulse at its output 96 in response to the integral signal exceeding the upper limit, whereas the second comparator 100 produces an output pulse at its output terminal 106 in response to the integral signal exceeding the minimum level reference Z.

The outputs 96, 106 from the comparators 90, 100 feed to a control logic circuit 110. The control logic circuit 110 has a trigger input terminal 112 which, when activated via an input pulse, causes the control logic to determine whether or not the output from the comparators 90, 100 sense that the integral signal is within or exceeding the predetermined upper and lower limits. If, at the time of a trigger pulse at input 112, the integral signal is between its upper and lower levels, defined by reference levels Y and Z, a pulse is generated at the control logic first output 114. If, however, it is sensed that the integral signal, at the time of a trigger pulse at input 112, exceeds the predetermined minimum and maximum values defined by reference levels Y and Z, a pulse is produced at a second control logic output 116.

A series of sample pulses, shown in FIGS. 2H or 2N, depending on the particular reference signal that has been selected, are applied to the trigger input 112 of the control logic 110. The generation of the sample pulses is more fully discussed herein below, however, it is sufficient to say that a sample pulse is generated corresponding to the occurrence of a particular point in each cycle of the selected reference signal, namely, just prior to the conclusion of each selected reference signal cycle.

While a detailed schematic diagram of the control logic 110 is not provided, it would be apparent to anyone of ordinary skill in the art, given the above described inputs and desired outputs, as to numerous operative configurations.

The first output 114 from the control logic circuit 110 is applied to the clock input 122 of a conventional counter 120. The counter 120 has a reset input 124, to which is applied the second output 116 from the control logic 110. As it will be more clearly shown herein below, a pulse on control logic 114 corresponds to the wrong reference phase being chosen, whereas a pulse on the second control logic output 116 corresponds to the condition of the proper reference signal phase being chosen. Thus, the counter 120 sequentially counts out the number of error signals received at its clock input 122, and resets to 0 in response to the occurrence of a signal at its reset input 124. In the preferred embodiment of the invention, the counter 120 produces a pulse on its output line 126 in response to having counted eight successive signals appearing at its clock input 122.

Thus, for each of eight or more successive error signals produced at the control logic output 114 the counter 120 produces a pulse on its output line 126, as illustrated in FIG. 2P. In the absence of produced error pulses, the output line 126 waveform is as shown in FIG. 2J.

The output line 126 of counter 120 feeds to the first input 132 of a conventional AND gate 130, which has a second input 134 and an output 136. Applied to the second input 134 of AND gate 130 are the sample pulses, as shown in FIGS. 2H and 2N. A pulse is produced at the AND gate output 136 in response the synchronous occurrence of a pulse at both AND gate inputs 132, 134, respectively. Thus, upon receiving an output pulse from the counter 120 and a synchronous sample pulse, the AND gate 130 produces an output pulse on line 136 which, in turn, is fed to the reset input 58 of the bistable 50. As mentioned hereinabove, a pulse at the reset input 58 causes the reference phase appearing at the divide by two bistable outputs 54, 56 to change 180° in phase.

Then, when eight successive error pulses have been counted by counter 120, the system reacts by selecting the alternate reference signal which is assumed to be the properly phased clock signal. By waiting until eight error signals are counted, the system does not falsely react to spurious noise signals.

The synchronizer 10 may be used in combination with the further demodulator circuitry 12 whereby the split phase encoded data may be decoded back to the original raw data. The circuitry 12 includes the means for generating the previously described sample pulses. The sample pulse circuitry includes a negative differentiator 150 which receives the output from the phase lock loop 42 at its input terminal 152 and produces at its output 154 a signal having pulses appearing at the occurrence of negative transitions of the signal at its input 152. The negative transition pulses appearing at the differentiator output 154 are applied to the first input 162 of an AND gate 160. AND gate 160 has a second input 164 to which is applied the Q output 56 of the bistable 58. In response to simultaneous positive levels received at its inputs 162, 164 the AND gate 160 produces a positive output pulse at its output terminal 166. The pulse at AND gate output 166 is time delayed through a delay circuit 170, thus providing the sample pulse. The exact time delay provided by the circuit 170 is sufficient such that the sample pulse is generated at a position of the selected reference signal which occurs just prior to a complete cycle thereof. By using the delay circuitry 170, the sample pulse can be generated immediately prior to a complete selected reference signal cycle such that, through the operation of the control logic circuit 110, the system senses the magnitude of the integral signal just prior to the integrate and dump circuit 70 being reset via the dump input 72.

The sample pulses are also fed to the first input 182 of a data sample circuit 180. The data sample circuit 180 has a second input 184, to which is coupled the output from a comparator 190. Comparator 190 has a first input 192 which receives the integral signal from the integrate and dump circuit 70 and a second input 194 to which is applied a reference DC signal, reference X. Referring to FIGS. 2G and 2M, the reference level X is selected to be the symmetric midpoint, or axis of the integral signal. Thus, the output from the comparator 190 assumes a high or low value dependent upon whether the integral signal is above, or below its axis, respectively. The data sample circuit 180 responds to receiving a sample pulse at its input 182 by transferring the signal at its second input 184 to an output terminal 186. Depending upon the particular reference signal selected, the output waveform will either be that shown in FIG. 2I or 2O. Thus, the data sample circuit 180 operates as a D type flip flop, receiving the sample pulses on its clock input, and the output from comparator 190 at its D output, with the data sample output terminal 186 being the Q output from the flip flop.

Comparing FIGS. 2A, 2I and 2O, it is seen that for the condition of the integral signal being within the upper and lower limits ref Y and ref Z at the occurrence of a sample pulse that the decoding is improper and the phase change clock pulses, FIG. 2P are generated thereby causing the alternate reference signal i.e. FIG. 2E to be selected, at which point proper decoding occurs and no further error pulses are generated.

In summary, then, an improved synchronizer for split phase modulated data has been described. The synchronizer requires a minimum of inexpensive, but reliable parts for implementation whereby it is easy to manufacture and inexpensive to realize. A full split phase encoded demodulator may be fabricated by combining the improved synchronizer with a small number of additional components.

While a preferred embodiment of the invention has been described in detail, it should be understood that many modifications and variations thereto are possible, all of which fall within the true spirit and scope of the invention.

I claim:

1. A synchronizer for receiving encoded data of the split phase clock synchronous encoded type and recovering the clock signal therefrom, comprising:
   reference signal means selectable to produce either a first or a second reference signal, each reference signal having the same frequency as the clock signal at a phase angle of 180° with respect to the other signal;
   synchronous detecting means for synchronously detecting the received encoded data with the selected reference signal;
   integrator means for producing an integral signal having a value representative of the integral of the synchronous detecting means output over each cycle of the selected reference signal;
   comparator means for producing an error signal in response to the integral signal having a value within predetermined minimum and maximum values; and
   control logic means for processing the error signals and selecting the alternate output from the reference signal means responsive to a predetermined condition thereof,
   whereby the selected reference signal is synchronized to the clock signal.

2. The synchronizer of claim 1 wherein the reference signal means comprises:
   differentiating means for producing a pulse at each transition of the receiver encoded data;
   bandpass filter means for processing the transition pulses from the differentiating means and passing the signal components thereof which are at twice the clock frequency;
   a phase locked loop for producing an oscillator output signal which is in phase quadrature with the bandpass filter passed signal; and a bistable circuit operative to divide the oscillator output signal by two, the bistable including means adapted to respond to a received trigger signal to produce its divided output either at 0° or 180° relative phase.

3. The synchronizer of claim 1 wherein the synchronous detecting means is comprised of an exclusive OR gate.

4. The synchronizer of claim 1 wherein the control logic means comprises:
means to generate correct signals in response to the integral signal exceeding said predetermined upper or lower limits; and
counter means for processing both the comparator produced error signals and said generated correct signals and activating the reference signal means to select the alternate reference signal in response to a predetermined relationship therebetween.

5. A synchronizer for receiving encoded data of the split phase, clock derived type and regenerating the properly phased clock signal thereof, comprising:
oscillator means for generating an oscillator signal which is in predetermined phase relationship with the clock signal and is at twice the frequency thereof;
divider means for producing first and second signals, each signal having a frequency of one-half the oscillator frequency, the two signals having a relative phase angle of 180° with respect to each other;
selecting means for selecting either the first or the second signal;
logic gate means for processing the received data with the selected first or second signal and producing a first logic level output in response to said processed signals synchronously assuming the same logic state, the logic gate otherwise producing a second logic level;
integrator means for integrating the logic gate means produced signal over each cycle of the selected first or second signal and producing an analog signal representative of said integral;
comparator means for producing an error signal in response to the integrator produced analog signal being within predetermined upper and lower limits; and
control logic means for processing the comparator produced error signals and activating the selecting means to select the alternate signal in response to a predetermined error signal condition,
whereby the produced output of the divider means tends to be the regenerated and properly phased clock signal.

6. The synchronizer of claim 5 wherein the oscillator means comprises a phase locked loop.

7. The synchronizer of claim 5 wherein the oscillator means comprises:
differentiating means for producing a pulse at each transition of the received encoded data;
bandpass filter means for processing the transition pulses from the differentiating means and passing those signal components thereof which are twice the clock frequency; and
a phase locked loop for producing an oscillator output signal which is in phase quadrature with the bandpass filter passed signal.

8. The synchronizer of claim 5 wherein the logic state means is comprised of an exclusive OR gate.

9. The synchronizer of claim 5 wherein the control logic means comprises:
means to generate correct signals in response to the integrator produced analog signal exceeding said predetermined upper or lower limits; and
counter means for processing both the comparator produced error signals and said generated correct signals and activating the selecting means to select the alternate first or second signal in response to a predetermined relationship therebetween.

10. The synchronizer of claim 5 in combination with demodulator means for decoding said received data, said combination comprising:
sample pulse generating means for producing a sample pulse at a predetermined point in each cycle of the selected first or second signal; and
data sample means for producing a recovered data signal having predetermined first or second levels responsive to the status of the integrator produced logic level at the time of each produced sample pulse.

11. A demodulator for receiving and decoding data of the split phase, clock synchronous encoded type, comprising:
reference signal means selectable to produce either a first or a second reference signal, each reference signal having the same frequency as the clock frequency at a phase angle of 180° with respect to the other signal;
synchronous detecting means for synchronously detecting the received encoded data with the selected reference signal;
integrator means for producing an integral signal having a value representative of the integral of the synchronous detecting means output over each cycle of the selected reference signal;
comparator means for producing an error signal in response to the integral signal having a value within predetermined minimum and maximum values;
control logic means for processing the error signals and selecting the alternate output from the reference signal means responsive to a predetermined condition thereof;
sample pulse generating means for producing a sample pulse at a predetermined point in each cycle of the selected reference signal; and
decoded data output means for producing an output signal having either a first or a second logic level responsive to the status of the integral signal synchronous to the occurrence of each sample pulse.

12. The demodulator of claim 11 wherein the reference signal means comprises:
differentiating means for producing a pulse at each transition of the received encoded data;
bandpass filter means for processing the transition pulses from the differentiating means and passing the signal components thereof which are at twice the clock frequency;
a phase locked loop for producing an oscillator output signal which is in phase quadrature with the bandpass filter passed signal; and
a bistable circuit operative to divide the oscillator output signal by two, the bistable including means adapted to respond to a received trigger signal to produce its divided output either at 0° or 180° relative phase.

13. The demodulator of claim 11 wherein the synchronous detecting means is comprised of an exclusive OR gate.

14. The demodulator of claim 11 wherein the control logic means comprises:
   means to generate correct signal in response to the integral signal exceeding said predetermined upper or lower limits; and
   counter means for processing both the comparator produced error signals and said generated correct signals and activating the reference signal means to select the alternate reference signal in response to a predetermined relationship therebetween.

15. The demodulator of claim 11 wherein the decoded output data means comprises a D type flip flop with the integral signal coupled to its D input and the sample pulses coupled to its clock input whereby its Q output produces the decoded data.

* * * * *